United States Patent
March

(10) Patent No.: US 10,312,485 B2
(45) Date of Patent: Jun. 4, 2019

(54) BATTERY ASSEMBLY ARRAY PLATE

(71) Applicant: FORD GLOBAL TECHNOLOGIES, LLC, Dearborn, MI (US)

(72) Inventor: Zachary March, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 419 days.

(21) Appl. No.: 14/807,054

(22) Filed: Jul. 23, 2015

(65) Prior Publication Data
US 2017/0025653 A1    Jan. 26, 2017

(51) Int. Cl.
| | |
|---|---|
| *H01M 2/10* | (2006.01) |
| *H01M 10/62* | (2014.01) |
| *H01M 10/625* | (2014.01) |
| *H01M 10/6554* | (2014.01) |
| *H01M 10/613* | (2014.01) |

(52) U.S. Cl.
CPC ....... *H01M 2/1077* (2013.01); *H01M 10/613* (2015.04); *H01M 10/625* (2015.04); *H01M 10/6554* (2015.04); *H01M 2220/20* (2013.01)

(58) Field of Classification Search
CPC .......... H01M 2220/20; H01M 2/1077; H01M 2/0245; H01M 10/6555
See application file for complete search history.

(56) References Cited

U.S. PATENT DOCUMENTS

| | | | | |
|---|---|---|---|---|
| 2010/0178547 | A1* | 7/2010 | Li | H01M 2/0245 429/151 |
| 2013/0130073 | A1* | 5/2013 | Kim | H01M 2/1077 429/61 |
| 2013/0189559 | A1 | 7/2013 | Giere | |
| 2014/0295227 | A1* | 10/2014 | Aoki | H01M 2/1016 429/82 |
| 2014/0356684 | A1* | 12/2014 | Lim | H01M 10/4207 429/120 |
| 2015/0010833 | A1* | 1/2015 | Amendola | H01M 4/8647 429/406 |
| 2015/0024253 | A1* | 1/2015 | Noh | H01M 2/1016 429/156 |
| 2015/0030897 | A1 | 1/2015 | Paramasivam et al. | |
| 2015/0072206 | A1 | 3/2015 | Houchin-Miller et al. | |
| 2015/0140408 | A1* | 5/2015 | Hayashida | H01M 2/1061 429/159 |
| 2015/0144409 | A1* | 5/2015 | Fujii | B60L 11/1879 180/65.1 |
| 2015/0333304 | A1* | 11/2015 | Sekine | H01M 2/1077 429/153 |
| 2015/0340669 | A1* | 11/2015 | Aoki | H01M 2/1077 429/151 |

FOREIGN PATENT DOCUMENTS

| | | |
|---|---|---|
| CN | 102782896 B | 4/2015 |
| EP | 2064758 B1 | 9/2014 |
| KR | 101084064 B1 | 11/2011 |

* cited by examiner

*Primary Examiner* — Scott J. Chmielecki
(74) *Attorney, Agent, or Firm* — Carlson, Gaskey & Olds

(57) ABSTRACT

A battery pack according to an exemplary aspect of the present disclosure includes, among other things, an array plate including a first engagement feature configured to engage a second engagement feature when the first engagement feature is positioned proximate another structure equipped with the second engagement feature.

20 Claims, 7 Drawing Sheets

BATTERY ASSEMBLY ARRAY PLATE

TECHNICAL FIELD

This disclosure relates to a battery pack for an electrified vehicle. A battery assembly of the battery pack includes an array plate having a first engagement feature configured to engage a second engagement feature of a structure positioned proximate to the battery assembly.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack for powering electric machines and other electrical loads typically includes multiple battery assemblies, or battery arrays, that include a plurality of interconnected battery cells. There is often a limited amount of space available within the electrified vehicle for accommodating the battery pack. Therefore, space efficient packagings are desired.

SUMMARY

A battery pack according to an exemplary aspect of the present disclosure includes, among other things, an array plate including a first engagement feature configured to engage a second engagement feature when the first engagement feature is positioned proximate another structure equipped with the second engagement feature.

In a further non-limiting embodiment of the foregoing battery pack, the array plate includes a first side region facing toward a battery cell and a second side region facing in a direction away from the battery cell.

In a further non-limiting embodiment of either of the foregoing battery packs, the first engagement feature protrudes from the second side region.

In a further non-limiting embodiment of any of the foregoing battery packs, the structure is a second array plate.

In a further non-limiting embodiment of any of the foregoing battery packs, the structure is an enclosure.

In a further non-limiting embodiment of any of the foregoing battery packs, the first engagement feature is a protrusion and the second engagement feature is a channel.

In a further non-limiting embodiment of any of the foregoing battery packs, the first engagement feature and the second engagement feature are trapezoidal shaped.

In a further non-limiting embodiment of any of the foregoing battery packs, the array plate is disposed at a first longitudinal extent of a first grouping of battery cells, and the second engagement feature is part of a second array plate disposed at a second longitudinal extent of a second grouping of battery cells.

In a further non-limiting embodiment of any of the foregoing battery packs, both of the array plate and the second array plate include a plurality of the first engagement feature and a plurality of the second engagement feature.

In a further non-limiting embodiment of any of the foregoing battery packs, the array plate is disposed along a side of a first grouping of battery cells, and the second engagement feature is part of a second array plate and is disposed along a second side of a second grouping of battery cells.

A battery pack according to another exemplary aspect of the present disclosure includes, among other things, a first battery assembly including a first array plate, a second battery assembly adjacent to the first battery assembly and an enclosure at least partially surrounding the first battery assembly and the second battery assembly. At least one of the second battery assembly and the enclosure is configured to interlock with the first array plate.

In a further non-limiting embodiment of the foregoing battery pack, the first array plate interlocks with the enclosure, and a second array plate of the first battery assembly interlocks with a third array plate of the second battery assembly.

In a further non-limiting embodiment of either of the forgoing battery packs, each of the first battery assembly, the second battery assembly and the enclosure include a plurality of first engagement features and a plurality of second engagement features.

In a further non-limiting embodiment of any of the foregoing battery packs, the enclosure includes a rib that extends between at least two walls of the enclosure.

In a further non-limiting embodiment of any of the foregoing battery packs, the rib is configured to interlock with the first array plate.

In a further non-limiting embodiment of any of the foregoing battery packs, the enclosure includes a clamping feature configured to retain at least the first battery assembly within the enclosure.

In a further non-limiting embodiment of any of the foregoing battery packs, a spacer is positioned between the first battery assembly and the second battery assembly.

In a further non-limiting embodiment of any of the foregoing battery packs, a cold plate is in contact with at least one of the first battery assembly and the second battery assembly.

A method according to another exemplary aspect of the present disclosure includes, among other things, inserting a first battery assembly into an enclosure of a battery pack such that a first engagement feature of an array plate of the first battery assembly interlocks with a second engagement feature of either the enclosure or a second battery assembly.

In a further non-limiting embodiment of the foregoing method, the inserting step includes sliding the first battery assembly into the enclosure from a top of the enclosure toward a bottom of the enclosure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details several exemplary battery packs for use within an electrified vehicle. One exemplary battery pack includes an array plate having a first engagement feature configured to engage a second engagement feature when the first engagement feature is positioned proximate to the second engagement feature. In some embodiments, the second engagement feature is part of a second battery assembly located adjacent to the first battery assembly. In other embodiments, the second engagement feature is part of an enclosure of the battery pack. These and other features are discussed in greater detail in the following paragraphs of this detailed description.

Figure 1:
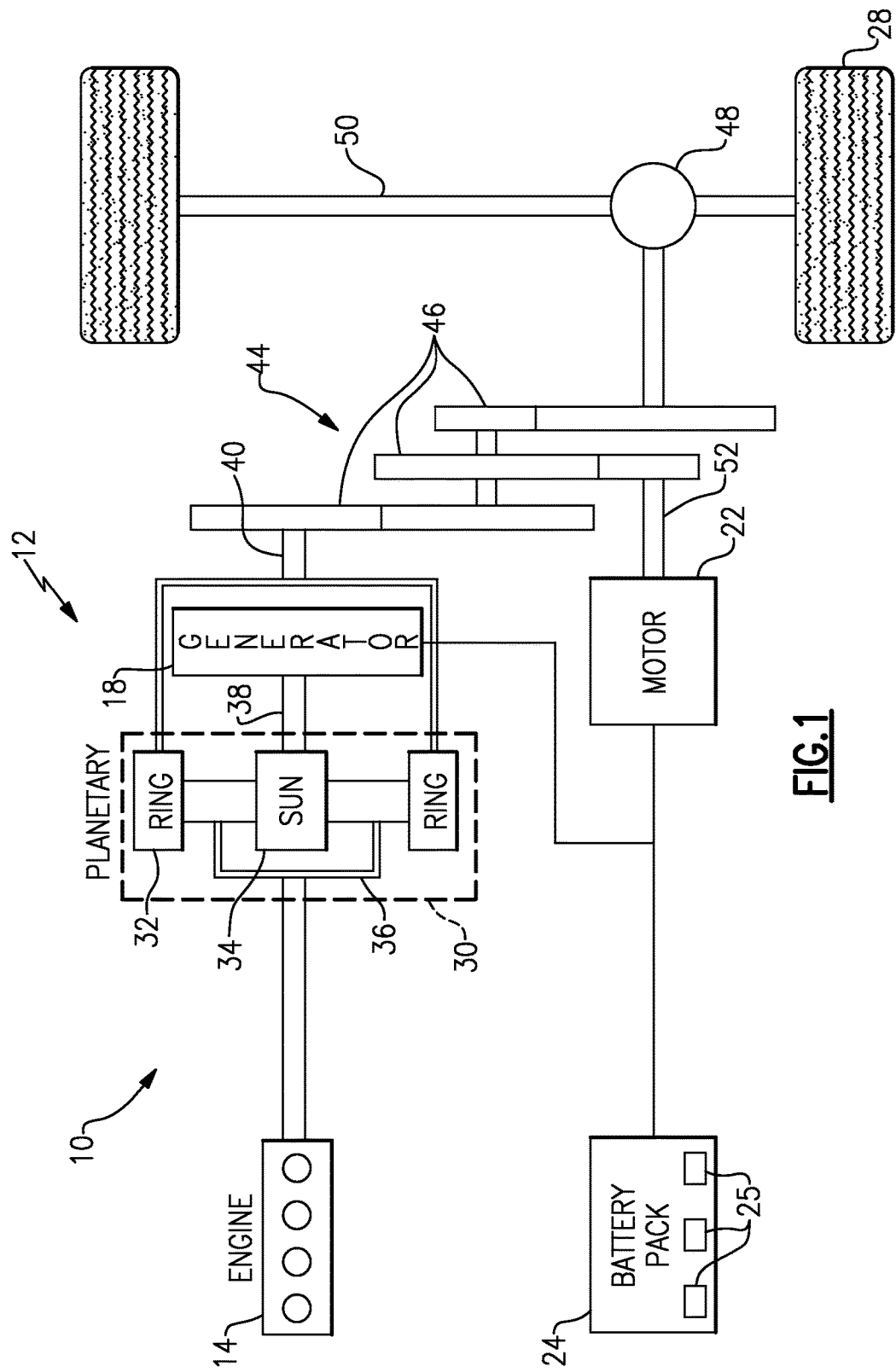
FIG. 1 schematically illustrates a powertrain of an electrified vehicle.

FIG. 1 schematically illustrates a powertrain 10 of an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
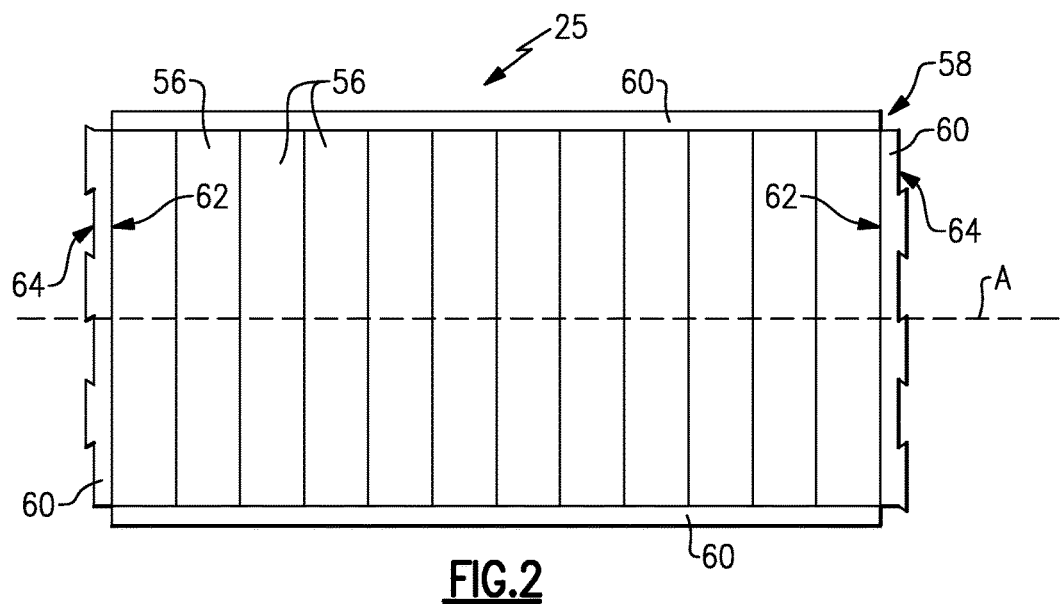
FIG. 2 illustrates a battery assembly of an electrified vehicle.

FIG. 2 illustrates a battery assembly 25 that can be employed within an electrified vehicle. For example, the battery assembly 25 could be part of the battery pack 24 of the electrified vehicle 12 shown in FIG. 1. The battery assembly 25 includes a plurality of battery cells 56 for supplying electrical power to various electrical loads of the electrified vehicle 12. Although a specific number of battery cells 56 are depicted in FIG. 2, the battery assembly 25 could employ a greater or fewer number of battery cells within the scope of this disclosure. In other words, this disclosure is not limited to the specific configuration shown in FIG. 2.

The battery cells 56 may be stacked side-by-side along a longitudinal axis A to construct a grouping of battery cells 56, sometimes referred to as a "cell stack." In one non-limiting embodiment, the battery cells 56 are prismatic, lithium-ion cells. However, battery cells having other geometries (cylindrical, pouch, etc.), other chemistries (nickel-metal hydride, lead-acid, etc.), or both, could alternatively be utilized within the scope of this disclosure. Although not shown, spacers or separators may be positioned between adjacent battery cells 56. The spacers electrically isolate the battery cells 56 from one another.

In one non-limiting embodiment, the battery cells 56 are supported by a support structure 58. The support structure 58 may include two or more array plates 60 that are configured to axially constrain the stacked battery cells 56. In one non-limiting embodiment, the array plates 60 are disposed at the longitudinal extents of the battery assembly 25 (see, e.g., FIG. 4). In other words, the array plates 60 could be configured as end walls of the support structure 58. In another non-limiting embodiment, the array plates 60 are disposed along the sides of the battery assembly 25 (see, e.g., FIG. 5). In other words, the array plates 60 could be configured as side walls of the support structure 58. In yet another non-limiting embodiment, the support structure 58 could include array plates 60 disposed along both the sides and ends of the battery assembly 25 (see, e.g., FIG. 2). As discussed in greater detail below, one or more of the array plates 60 may include engagement features for interlocking with corresponding engagement features of other structures positioned proximate to the battery assembly 25, such as, for example, another battery assembly or a battery pack enclosure.

Figure 3:
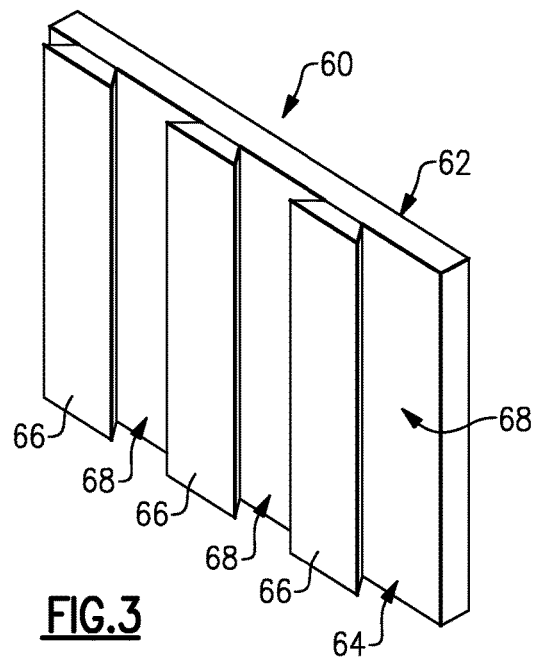
FIG. 3 illustrates an array plate of a battery assembly.

An exemplary array plate 60 is illustrated in FIG. 3. The array plate 60 includes a first side region 62 and a second side region 64 opposite of the first side region 62. In one embodiment, the first side region 62 faces toward the battery cells 56, and the second side region 64 faces in a direction away from the battery cells 56 (see, e.g., FIG. 2).

The array plate 60 may be made of either metallic materials (aluminum, steel, etc.) or plastic materials. In one non-limiting embodiment, the array plate 60 is an extruded part. However, other manufacturing techniques, including but not limited to casting techniques, can be used to form the array plate 60.

The second side region 64 of the array plate 60 includes first engagement features 66 and second engagement features 68. The array plate 60 could include any amount of the first and second engagement features 66, 68 and is not limited to the specific arrangement of features shown in FIG. 3. The first engagement features 66 may protrude outwardly from the second side region 64 in a direction that extends away from the first side region 62, and the second engagement features 68 may extend between adjacent first engagement features 66.

In one non-limiting embodiment, the first engagement features 66 are protrusions and the second engagement features 68 are channels. In another non-limiting embodiment, the first engagement features 66 and the second engagement features 68 are trapezoidal shaped. However, other shapes and configurations are also contemplated within the scope of this disclosure.

Figure 4:
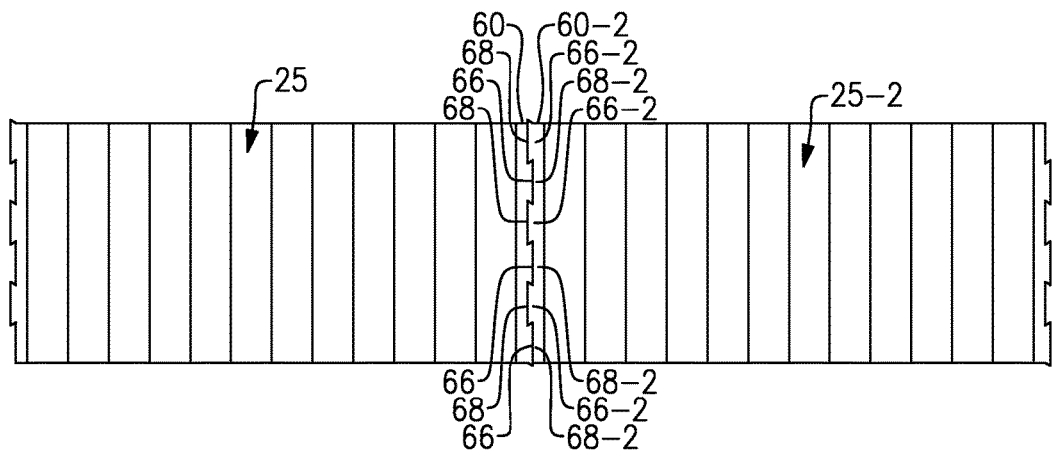
FIG. 4 illustrates a pair of interlocked battery assemblies.
Figure 5:
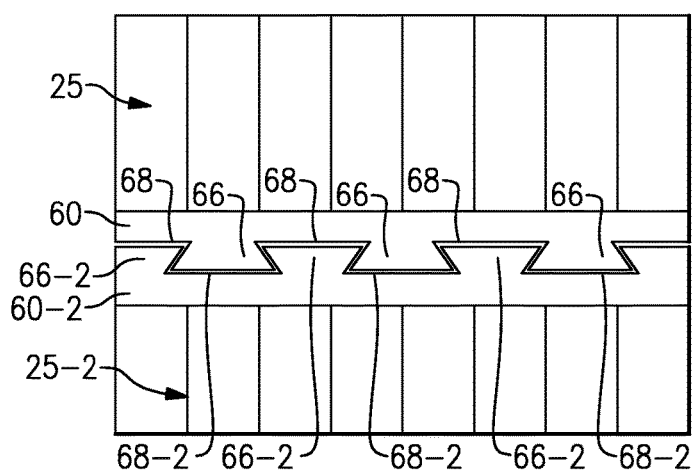
FIG. 5 illustrates another pair of interlocked battery assemblies.

Referring now to FIG. 4, the first engagement features 66 of the array plate 60 are configured to interlock with corresponding second engagement features 68-2 of a second array plate 60-2 when the second array plate 60-2 is positioned proximate to the array plate 60. The second array plate 60-2 is common (i.e., has the same overall design and features) to the array plate 60. However, because the array plate 60 and the second array plate 60-2 are disposed at opposite ends of their respective battery assemblies 25, 25-2 (i.e., one on the right hand side and the other on the left hand side), the first engagement features 66 of the array plate 60 are aligned with the second engagement features 68-2 of the second array plate 60-2 when the second battery assembly 25-2 is positioned proximate to the battery assembly 25. Similarly, the first engagement features 66-2 of the second array plate 60-2 may interlock or engage the second engagement features 68 of the array plate 60. In this way, the battery assembly 25 and the second battery assembly 25-2 may be secured together end-to-end. A similar interconnection can be achieved along the sides of the battery assembly 25 and the second battery assembly 25-2 by providing first and second array plates 60, 60-2 each having first engagement features 66, 66-2 and second engagement features 68, 68-2 that are configured to interlock with one another (see FIG. 5).

Figure 6:
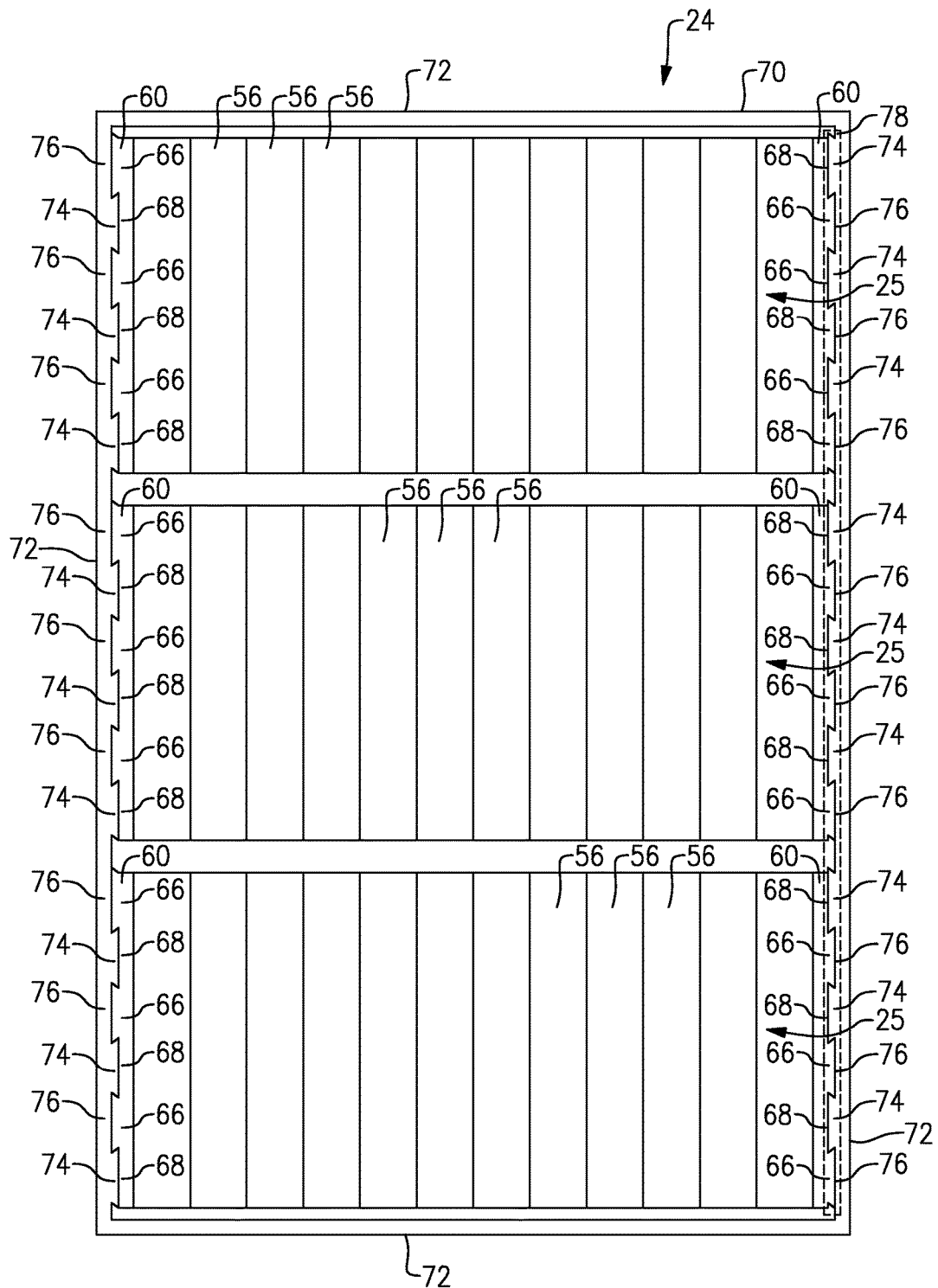
FIG. 6 illustrates a battery pack.

FIG. 6 is a top view of an exemplary battery pack 24. The battery pack 24 includes a plurality of battery assemblies 25 that are generally surrounded by an enclosure 70. The enclosure 70 includes a plurality of wall 72. In this embodiment, a top wall or cover of the enclosure 70 is removed to better illustrate the internal contents of the battery pack 24.

Each battery assembly 25 of the battery pack 24 may include a plurality of battery cells 56 disposed between opposing array plates 60 positioned at the longitudinal extents of the battery assemblies 25. Each array plate 60 includes first engagement features 66 and second engagement features 68 for securing the battery assembly 25 within the enclosure 70.

In one non-limiting embodiment, a portion of the walls 72 of the enclosure 70 include first engagement features 74 and second engagement features 76. The first and second engagement features 74, 76 may be integral with the walls 72 or could be separate inserts that are attached to the walls 72. The first engagement features 66 of the array plates 60 are configured to interlock with the second engagement features 76 of the walls 72 of the enclosure 70. Similarly, the first engagement features 74 of the walls 72 are configured to interlock with the second engagement features 68 of the array plates 60. In this way, each battery assembly 25 can be secured to the enclosure 70. In another non-limiting embodiment, each battery assembly 25 may be inserted into the enclosure 70 from the top of the enclosure 70 by aligning the first engagement features 66 of the array plates 60 with the second engagement features 76 of the walls 72 and then sliding each battery assembly 25 down into the enclosure 70. The engagement features 66, 68, 74, 76 guide the battery assemblies 25 into place within the battery pack 24.

One or more clamping features 78 may be secured laterally across each array plate 60 of each battery assembly 25. In one non-limiting embodiment, the clamping feature 78 is a bar or sheet secured at the edges of the battery assemblies 25. The clamping feature 78 retains the battery assemblies 25 in the vertical direction (i.e., into the page in FIG. 6).

Figure 7:
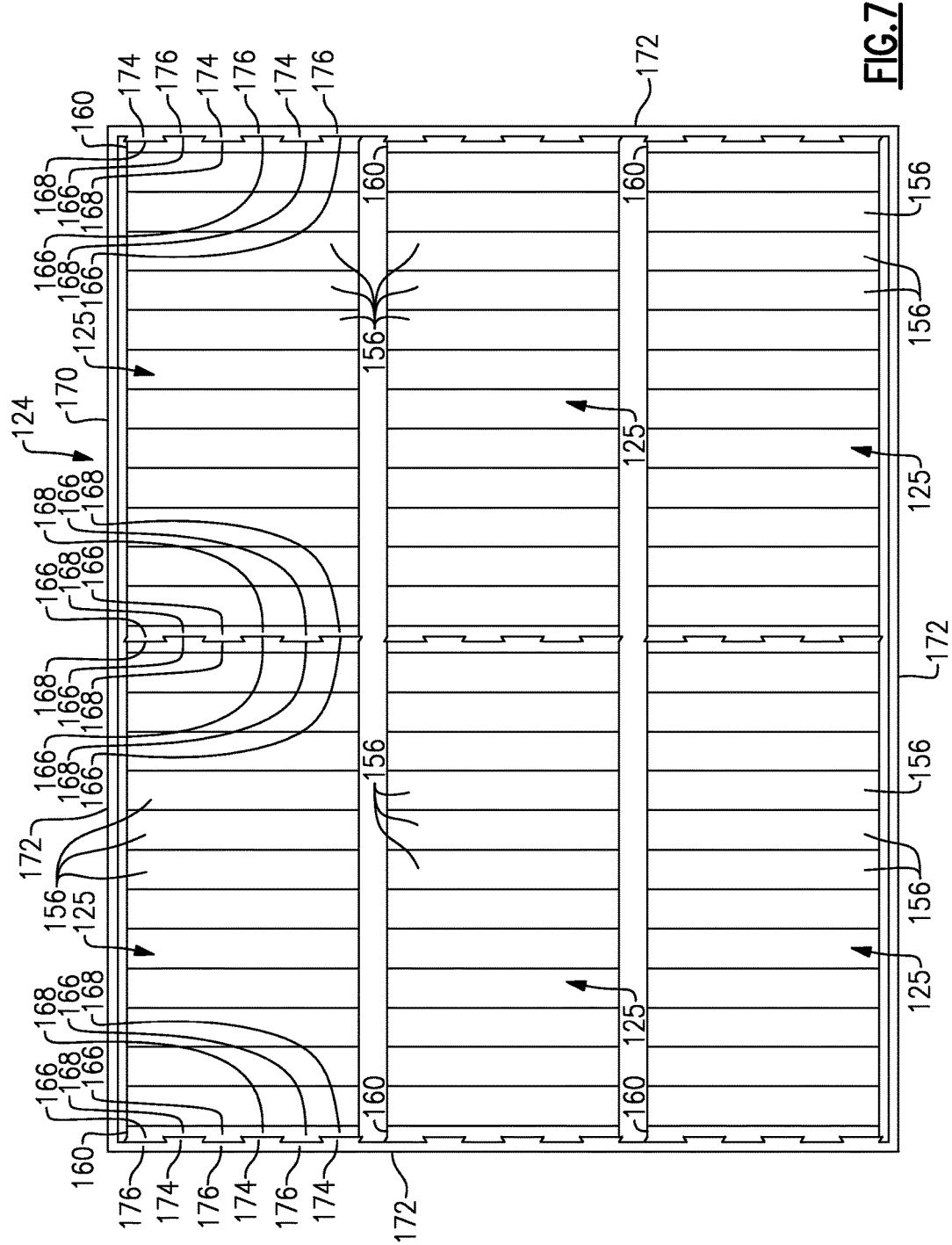
FIG. 7 illustrates another battery pack.

FIG. 7 is a top view of another exemplary battery pack 124. In this disclosure, like reference numbers designate like elements where appropriate and reference numerals with the addition of 100 or multiples thereof designate modified elements that are understood to incorporate the same features and benefits of the corresponding original elements.

The battery pack 124 includes a plurality of battery assemblies 125 that are generally surrounded by an enclosure 170. The enclosure 170 includes a plurality of walls 172. A top wall or cover of the enclosure 170 has been removed to better illustrate the internal contents of the battery pack 124. Each battery assembly 125 of the battery pack 124 includes a plurality of battery cells 156 disposed between array plates 160. Each array plate 160 includes first engagement features 166 and second engagement features 168. The walls 172 of the enclosure 170 also include first engagement features 174 and second engagement features 176.

In this non-limiting embodiment, each battery assembly 125 may be secured to both the enclosure 170 and to an adjacent battery assembly 125. For example, the first and second engagement features 166, 168 of some of the array plates 160 may engage or interlock with a portion of the first and second engagement features 174, 176 of the walls 172, and the first and second engagement features 166, 168 of other of the array plates 160 may engage with corresponding first and second engagement features 166, 168 of proximately positioned array plates 160.

Figure 8:
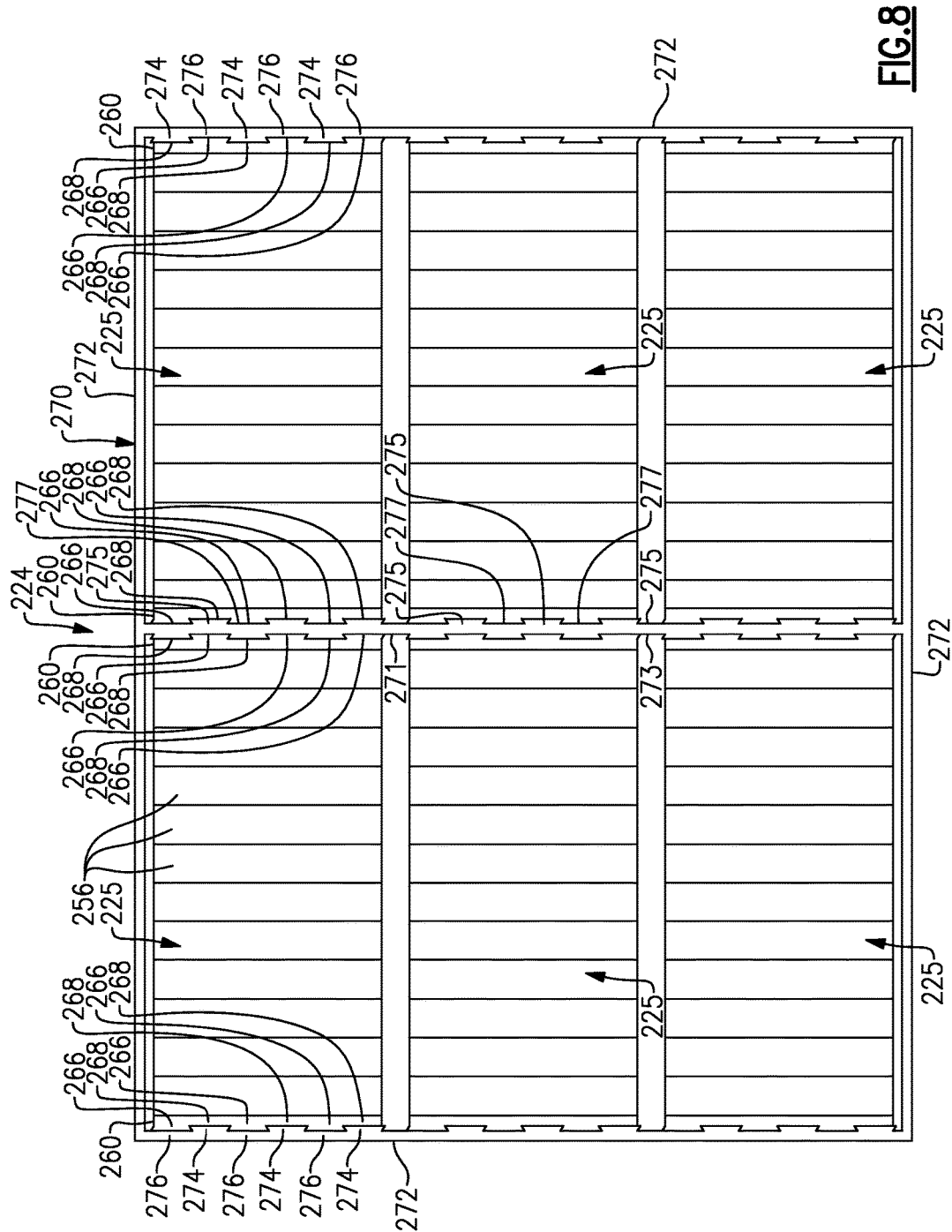
FIG. 8 illustrates another battery pack.

FIG. 8 is a top view of yet another exemplary battery pack 224. The battery pack 224 includes a plurality of battery assemblies 225 that are generally surrounded by an enclosure 270 having a plurality of walls 272. Each battery assembly 225 of the battery pack 224 includes a plurality of battery cells 256 disposed between array plates 260. Each array plate 260 includes first engagement features 266 and second engagement features 268. The walls 272 of the enclosure 270 also include first engagement features 274 and second engagement features 276.

In another non-limiting embodiment, the enclosure 270 includes a rib 271 that extends across the battery pack 224, such as between two of the walls 272. The rib 271 increases the structural integrity of the enclosure 270. Opposing sides 273 of the rib 271 may include first and second engagement features 275, 277.

Each battery assembly 225 may be secured to one of the walls 272 of the enclosure 270 and to the rib 271. For example, the first and second engagement features 266, 268 of some of the array plates 260 may engage with a portion of the first and second engagement features 274, 276 of the walls 272, and the first and second engagement features 266, 268 of other of the array plates 260 may engage with first and second engagement features 275, 277 of the rib 271.

Figure 9:
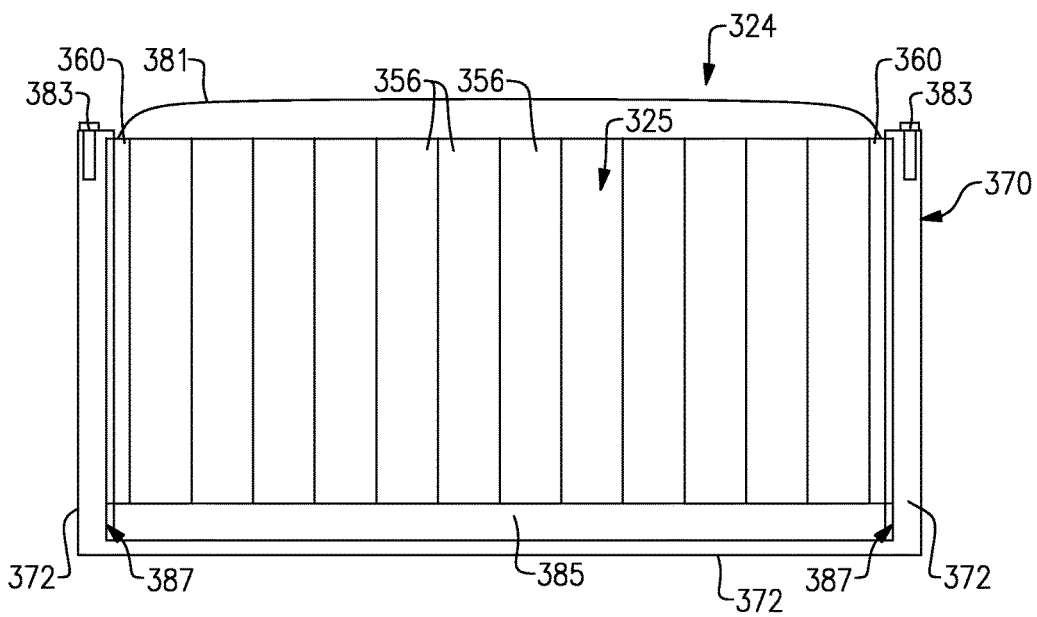
FIG. 9 illustrates yet another battery pack.

FIG. 9 is a side view of a battery pack 324. The battery pack 324 includes at least one battery assembly 325 that is generally surrounded by an enclosure 370 having a plurality of walls 372 and a cover 381. The cover 381 may be secured to some of the walls 372 using fasteners 383. In one non-limiting embodiment, the cover 381 acts as a clamping feature for retaining the battery assembly 325 in the vertical direction.

The battery assembly 325 of the battery pack 324 includes a plurality of battery cells 356 disposed between array plates 360. The array plates 360 may include engagement features (not shown in FIG. 9) for engaging corresponding engagement features of either the enclosure 370 or an adjacent battery assembly similar to any of the engagement configurations described above.

In another non-limiting embodiment, a cold plate 385 may be positioned between the battery assembly 325 and one of the walls 372, here a bottom wall, of the enclosure 370. The cold pate 385, which may alternatively be referred to as a heat exchanger plate, conducts heat from the battery cells 356. The cold plate 385 may act as a heat sink for removing heat generated by the battery cells 356. The cold plate 385 may include engagement features 387 for interlocking with the enclosure 370 in a similar manner as the battery assembly 325.

Figure 10:
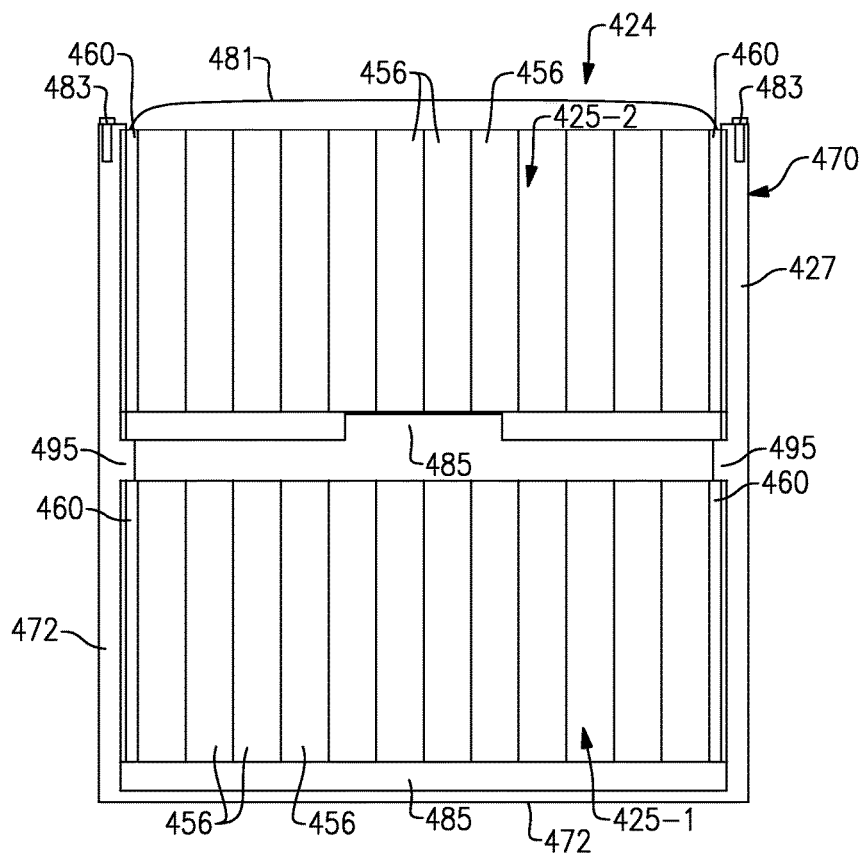
FIG. 10 illustrates yet another battery pack.

FIG. 10 is a side view of yet another battery pack 424. The battery pack 424 may include a first battery assembly 425-1 and a second battery assembly 425-2. In one non-limiting embodiment, the second battery assembly 425-2 is stacked vertically above or on top of the first battery assembly 425-1. One or more spacers 495 may be positioned between the first and second battery assemblies 425-1, 425-2 to space them from one another and create a multi-level battery pack.

The first and second battery assemblies 425-1, 425-2 are generally surrounded by an enclosure 470 having a plurality of walls 472 and a cover 481. The cover 481 may be secured to some of the walls 472 using fasteners 483.

Each of the first and second battery assemblies 425 includes a plurality of battery cells 456 disposed between array plates 460. The array plates 460 may include engagement features (not shown in FIG. 10) for engaging corresponding engagement features of either the enclosure 470 or an adjacent battery assembly in any of the ways disclosed above. The spacers 495 may also include engagement features (not shown) for interlocking with the enclosure 470 in a similar manner as the battery assemblies 425-1, 425-2.

In another non-limiting embodiment, a cold plate 485 is positioned in contact with each of the first and second battery assemblies 425-1, 425-2. The cold plates 485 act as heat sinks for removing heat generated by the battery cells 456.

The exemplary battery packs of this disclosure provide a compact and space efficient packaging design. The proposed designs substantially eliminate conventional bolting mechanisms inside the battery pack to render reduced volume packs that decrease assembly complexity and assembly time.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

We claim:

1. A battery pack, comprising:
   a grouping of battery cells disposed side-by-side along a single longitudinal axis;
   an array plate contiguous with at least one cell of said grouping of battery cells; and
   said array plate including a first engagement feature configured to engage a second engagement feature of an enclosure when said first engagement feature is positioned proximate to the enclosure,
   wherein said first engagement feature engages said second engagement feature as said grouping of battery cells is slid into said enclosure.

2. The battery pack as recited in claim 1, wherein said array plate includes a first side region facing toward said at least one cell and a second side region facing in a direction away from said at least one cell.

3. The battery pack as recited in claim 2, wherein said first engagement feature protrudes from said second side region.

4. The battery pack as recited in claim 1, wherein said first engagement feature is a protrusion and said second engagement feature is a channel.

5. The battery pack as recited in claim 1, wherein said first engagement feature and said second engagement feature are trapezoidal shaped.

6. The battery pack as recited in claim 1, wherein said array plate is disposed at a first longitudinal extent of said grouping of battery cells.

7. The battery pack as recited in claim 1, wherein said array plate is disposed along a side of said grouping of battery cells.

8. A battery pack, comprising:
a first battery assembly including a first grouping of battery cells and a first array plate;
a second battery assembly including a second grouping of battery cells adjacent to said first battery assembly; and
an enclosure at least partially surrounding said first battery assembly and said second battery assembly, and at least one of said second battery assembly and said enclosure is configured to interlock with said first array plate as said first battery assembly is slid into said enclosure;
wherein the enclosure is a separate structure from the first array plate.

9. The battery pack as recited in claim 8, wherein said first array plate interlocks with said enclosure, and a second array plate of said first battery assembly interlocks with a third array plate of said second battery assembly.

10. The battery pack as recited in claim 8, wherein each of said first battery assembly, said second battery assembly and said enclosure include a plurality of first engagement features and a plurality of second engagement features.

11. The battery pack as recited in claim 8, wherein said enclosure includes a rib that extends between at least two walls of said enclosure.

12. The battery pack as recited in claim 11, said rib configured to interlock with said first array plate.

13. The battery pack as recited in claim 8, wherein said enclosure includes a clamping feature configured to retain at least said first battery assembly within said enclosure.

14. The battery pack as recited in claim 8, comprising a spacer positioned between said first battery assembly and said second battery assembly.

15. The battery pack as recited in claim 8, comprising a cold plate in contact with at least one of said first battery assembly and said second battery assembly.

16. A method, comprising:
sliding a first battery assembly into an enclosure of a battery pack from a top of the enclosure toward a bottom of the enclosure such that a first engagement feature of an array plate of the first battery assembly interlocks with a second engagement feature of either the enclosure or a second battery assembly.

17. The battery pack as recited in claim 1, comprising a second array plate contiguous with another cell of said grouping of battery cells, wherein said second array plate includes a third engagement feature configured to engage a fourth engagement feature of said enclosure.

18. The battery pack as recited in claim 1, comprising a second array plate contiguous with another cell of said grouping of battery cells, wherein said second array plate includes a third engagement feature configured to engage a fourth engagement feature of a third array plate of a second grouping of battery cells.

19. The battery pack as recited in claim 8, wherein said first array plate includes both protrusions and channels formed on a side region of the first array plate.

20. The battery pack as recited in claim 19, wherein the protrusions engage second channels of either the enclosure or the second battery assembly and the channels of the first array plate engage second protrusions of either the enclosure or the second battery assembly.

* * * * *